June 13, 1944.        W. S. JAMES        2,351,213
TRANSMISSION
Filed Aug. 21, 1941        2 Sheets-Sheet 1

William S. James
INVENTOR
BY Walter E. Schirmer
ATTORNEY

June 13, 1944.    W. S. JAMES    2,351,213
TRANSMISSION
Filed Aug. 21, 1941    2 Sheets-Sheet 2

William S. James
INVENTOR

BY Walter E. Schimmer
ATTORNEY

Patented June 13, 1944

2,351,213

UNITED STATES PATENT OFFICE 2,351,213

TRANSMISSION

William S. James, South Bend, Ind., assignor to The Studebaker Corporation, South Bend, Ind., a corporation of Delaware Application August 21, 1941, Serial No. 407,714

23 Claims. (Cl. 74—189.5)

This invention relates to transmissions and more particularly is concerned with transmissions of the type employing a fluid torque converter in combination with planetary gearing.

The torque converter of the present invention may be of any type now in use having predetermined characteristics of operation and efficiency. Combined with the converter is a planetary gear drive which is connected, posterior to the torque converter, with the sun gear of the planetary system connected to the rotor of the converter. The planetary spider which carries the planet pinions between the sun gear and the ring gear is connected to the shaft carrying the stator of the torque converter, and the ring gear of the planetary system is connected to the driven shaft of the transmission.

One of the primary objects of the present invention is to provide a transmission of this general type in which it is possible to simplify the clutching and braking means for controlling the operation of the various elements of the transmission. In the present construction, for example, it is possible to provide a clutch element to control the rotation of the stator of the torque converter which clutch element may be brought out through the planetary spider and thus made easily accessible for the manipulation of the clutch. This means that the stator of the converter can be controlled externally thereof by any desired type of clutch such as a friction clutch member, a coil spring clutch, or any similar clutching mechanism.

The present transmission also adapts itself extremely well to automatic operation since the various clutches and brakes can all be arranged for easy accessibility and control by power operated means such as air pressure, liquid pressure, or the like.

Another distinct advantage of the present construction is the ability to provide for shifting of the transmission from ratio drive into direct drive and vice versa without at any time releasing the torque connection from the power source to the driven shaft. This is of extreme advantage in assuring that none of the parts will tend to run away during the clutching and braking operations, and also is desirable in that there is no time during the shifting operation when there is a loss of power being transmitted to the driving train.

Still another feature of the present invention is the provision of a construction in which the torque converter can be shifted into direct drive automatically after it has reached its point of maximum efficiency and can readily be stepped down into ratio drive whenever the conditions require the torque modifying influence of the converter. Similarly, the arrangement is so designed that the planetary gearing can be driven either through ratio or direct drive by means of a simple clutch operation which can be performed automatically.

The simplicity of design together with improved operating characteristics possible with a transmission of this type will become more apparent from the following detailed description which, taken in conjunction with the accompanying drawings, will disclose to those skilled in the art the particular construction and operation of a preferred form of the present invention.

Figure 1:
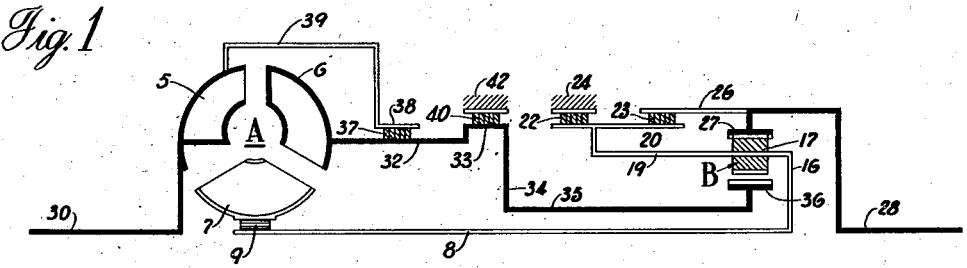
Figure 1 is a diagrammatic illustration of one form of the present invention indicated as being connected for ratio drive from the power source to the driven shaft.
Figure 2:
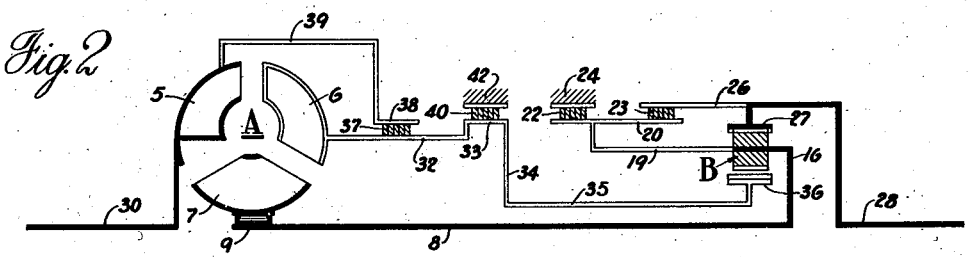
Figure 2 is a corresponding view of the same embodiment arranged for reverse drive.
Figure 4:
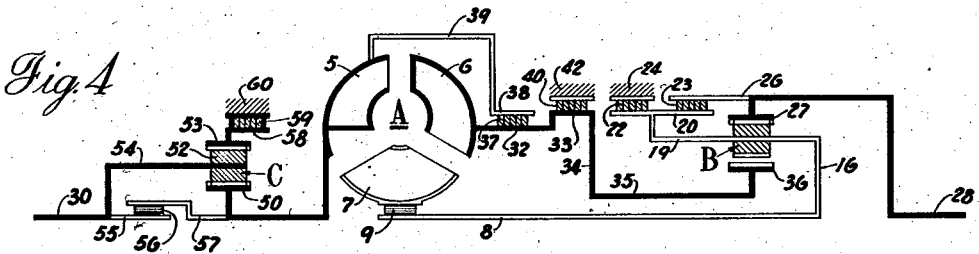
Figure 4 is a view of a modified embodiment of the invention corresponding to Figure 1.
Figure 5:
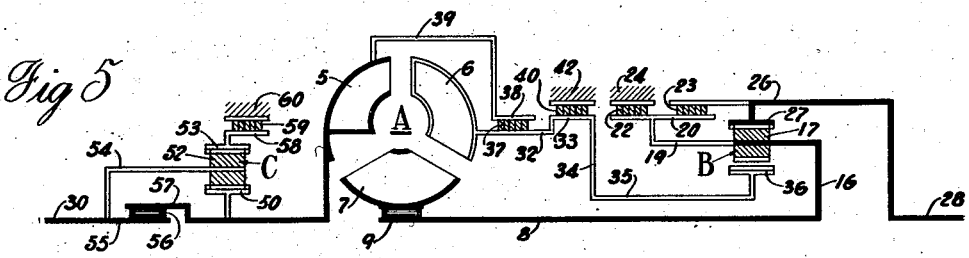
Figure 5 is a view of the transmission shown in Figure 4 connected for reverse drive.
Figure 3:
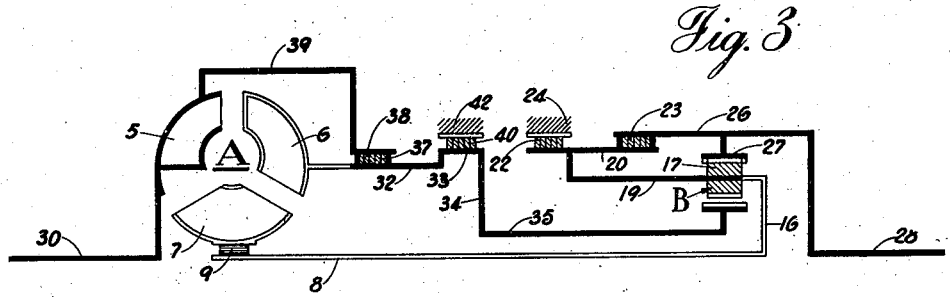
Figure 3 is a corresponding view showing the transmission of Figure 1 connected up for direct drive.
Figure 6:
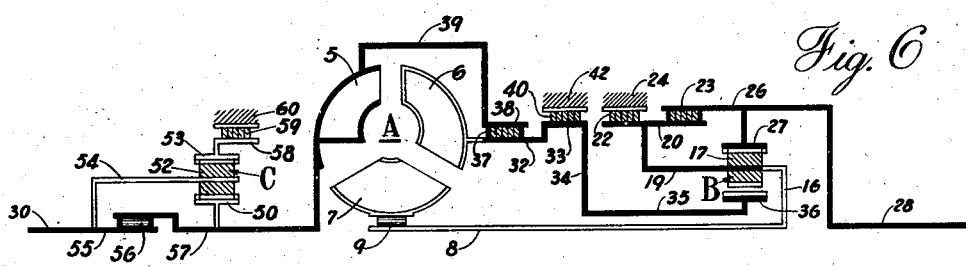
Figures 8, 9, 10:
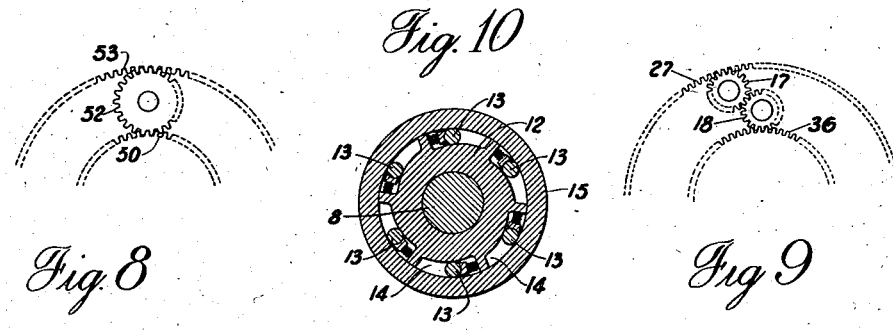
Figure 7:
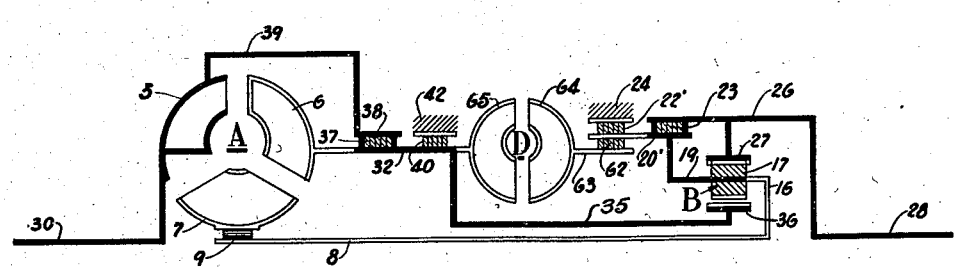

Figure 6 also shows the transmission of Figure 4 connected for direct drive;

Figure 7 is a modification of the transmission shown in Figures 1 to 3 arranged to provide for shifting without the loss of torque or without torque interruption;

Figure 8 is a diagrammatic view of the planetary gearing employed anterior to the torque converter in Figures 4, 5 and 6;

Figure 9 is a diagrammatic view of the planetary gearing embodied posterior to the converter in all forms of the transmission; and Figure 10 is a sectional view through one form of overrunning clutch that may be employed.

Referring now in detail to the form of the invention shown in Figures 1 to 3, inclusive, I have disclosed at A a torque converter consisting of the pump or impeller 5, the rotor or driven member 6 and the stator or reaction member 7. These are conventional elements of the usual well known torque converter and it is to be understood that the present invention is not limited to any particular type of torque converter.

The stator member 7 is mounted on the shaft indicated diagrammatically at 8 by means of an overrunning clutch 9, which clutch may be of the same form as shown in Figure 10, comprising a hub portion 12 mounted on the shaft 8 and provided with the series of ball members 13 operating within the wedge-shaped channels 14 formed between the hub member 12 and the outer rotating member 15 which in this form of the invention constitute the hub of the stator 7. It will be apparent that relative rotation of the member 15 relative to the shaft 8 in one direction produces a wedging action of the rollers 13 which locks the member 15 and the shaft 8 together for conjoint rotation. Relative rotation of the member in the opposite direction allows the shaft 8 to run free of the connecting hub 15 of the stator. The shaft 8 on which the stator is mounted by means of the clutch 9 is extended axially through the transmission and at its end carries a suitable spider indicated diagrammatically at 16 supporting a plurality of planet pinions 17 and 18 shown in more detail in Figure 9. The pinions 17 and 18 form a double planetary system providing for rotation of the ring gear in the same direction as the rotation of the sun gear. The planet spider 16 is also provided with an extension 19 which terminates in the axially extending braking surface 20, this braking surface being engaged by the coil spring clutch 23 and the coil spring brake 22, respectively. The brake and clutch 22 and 23 may be of the well known coil spring type or may be any type of friction clutch and brake, as desired.

The brake 22 is adapted to hold the braking surface 20 to a stationary portion or brake surface 24 of the transmission housing when in engaged position, thereby locking the planet spider and the shaft 8 against rotation relative to the housing. The clutch 23, on the other hand, is adapted to couple the planet spider 16 to the clutching surface 26 carried by the ring gear 21 of the planet system. When this coupling action is effected it produces a locking up of the ring gear and the planet spider to produce direct drive from the ring gear 21 into the shaft 28 of the transmission.

The pump or driving member 5 of the converter in this form of the invention is adapted to be driven from the power shaft 30 connected into a source of power such as an internal combustion engine or the like. In normal operation the stator 7, due to the overrunning clutch 9, is held stationary and, consequently, the pump member 5 operates through the fluid system within the converter to transmit torque to the rotor 6, this torque being transmitted through an infinitely variable ratio up to the point of maximum efficiency of the converter.

The rotor 6 is provided with an axially extending portion 32 which has a radially offset braking surface 32 and is also connected through the flange 34 and the sleeve 35 to the sun gear 36 of the planet system. The portion 32 of the rotor is adapted, under certain conditions, to be clutched directly to the pump member 5 of the converter through the clutch 37 which may be of the same form as the brake and clutch 22 and 23, whereby the rotor and pump member are clutched together to drive in direct or one-to-one ratio. This is effected through the clutch surface 38 connected to the portion 39 together with the pump member 5. The rotor 6 may also be locked against rotation to hold the sun gear against rotation by the use of the brake 40 which operates between the braking surface 33 and a fixed portion or brake surface 42 of the housing.

Considering now the construction as shown in Figure 1 of the drawings, the transmission power train is indicated by heavy black lines. In this form of the invention the clutch 37 and brake 40 are unlocked or disengaged, whereby the pump member 5 drives through the fluid in the converter the rotor 6 which rotor, in turn, being uncoupled with respect to the pump and also with respect to the housing 42, transmits this driving torque to the sun gear 36. It will be noted that no torque at this time is transmitted through the stator 7, the stator being held against rotation by means of the overrunning clutch 9 and the planet spider 16 being held against rotation by engagement of the brake 22. This locks the planet spider to the housing. Consequently, the torque transmitted into the rotor 6 is thence transmitted through the sun gear 36 and the planet pinions 17 and 18 into the ring gear 27 and thus to the driven shaft 28. It will be noted that with this construction there is a double ratio drive effected since there is a first torque ratio produced in the converter A between the pump 5 and the impeller 6 and a second ratio is produced in the planetary gearing indicated generally at B. It is apparent that by releasing the brake 22 and engaging the clutch 23 the planet spider 16 will be locked to the ring gear and, consequently, the sun gear 36 will drive the ring gear 27 in a one-to-one ratio. This produces a direct drive through the planetary system although a ratio drive may still be effected through the fluid torque converter. Thus, it will be seen that the mechanism can be coupled for controlling the brake 22 and clutch 23 to independently control the ratio or torque drive through the planetary system. It is to be understood, of course, that when the planet spider is clutched to the ring gear, the brake 22 allows the planet spider to rotate free of the housing 24 and the shaft 8 also rotates independently of the stator 7 due to the overrunning clutch 9.

It is also possible to produce a direct drive in the torque converter by engaging the clutch 37 and releasing the brake 40. Engagement of the clutch 37 locks the pump 5 to the rotor 6, cutting out any torque conversion between these two elements. As a result, the torque drive from the power shaft 30 to the sun gear 36 is in a one-to-one ratio, and as the clutch 23 is engaged, a positive direct drive to the driven shaft 28 is produced. This is shown in more detail in Figure 3 in which it will be noted that the clutch 37 is in locked position with the brake 40 and 42 disengaged and the clutch 23 locked.

With this construction the power flows along the heavy lines indicated in Figure 3 and a direct drive is produced between the shaft 30 and the driven shaft 28. It will be apparent that should a torque conversion be desired, the only shift required is to release or disengage the clutch 37 whereby the ratio drive is produced through the converter A and this can be accomplished with the engagement of the clutch 23 for direct drive through the planetary B or with the brake 22 applied for ratio drive through the planetary B, respectively.

Considering now Figure 1, I disclose a double ratio drive through the converter and the planetary gearing. This may be modified to produce a ratio in the torque converter with the planetary gearing locked in a one-to-one drive by disengagement of the brake 22 and engagement of the clutch 23, and a further change can be made by then engaging the clutch 37 which locks the converter in direct drive. It will be readily apparent that any suitable automatic power shift means may be used for actuating the brake and clutch 22, 23, clutch 37, as well as the brake 40.

In Figure 2 I have disclosed the power flow through the transmission when a reverse drive is to be effected. In this form of the invention the clutches 37, 23 and brake 22 are in disengagement while the brake 40 is engaged to lock the rotor member 6 against rotation and consequently this locks the sun gear 36 against rotation. With the brake 40 engaged and the remaining clutches and brakes disengaged the power from the shaft 30 will flow into the pump member 5 and will react against the stator 7 tending to rotate the stator 7 in the opposite direction. This, in turn, results in rotation of the planet spider 16 in the opposite direction and, since the sun gear 36 is locked against rotation, reverse rotation of the ring gear 37 is produced, thereby producing reverse drive of the shaft 28. Thus, it will be readily apparent that by disengagement of all of the clutches and brakes except the brake 40, reverse drive can be readily produced within this transmission. Consequently, it will be apparent that a relatively simple type of automatic shift mechanism can be employed for controlling the clutches and brakes shown.

One of the points of distinct advantage of this construction is that the control of the stator 7 can be provided externally of the torque converter and the planetary system by means of the clutch 37, thus simplifying to a considerable extent the clutching mechanism normally required for the control of the stator. Also with this construction, it is apparent that the clutches 23, 37 and brakes 22, 40 can all be of relatively simple construction and may be arranged to respond to any suitable type of control.

In Figures 4, 5 and 6 I have disclosed substantially the same transmission as disclosed in the embodiment shown in Figures 1 to 3 with the exception of providing a second planetary gearing system anterior to the torque converter A. This planetary system is indicated generally at C. The planet system C, however, employs single planet pinions, as shown in Figure 8, consisting of the sun gear 50, the planet pinions 52 and the ring gear 53. In this form of the invention the power shaft 30 is connected to the planet spider 54 carrying the planet pinions 52. The shaft 30 also is provided with an axial extension or hub portion 55 which through the rollers 56 is connected into the shaft 57 which carries the sun gear 50 and is also connected to the pump 5 of the torque converter. The rollers 56 form an overrunning clutch construction similar to that shown in Figure 10 and are provided for the purpose of coupling the power shaft 30 directly to the pump member 5 whenever the ring gear 53 is free for rotation. The ring gear 53 is provided with a brake member 58 which through the brake element 59 allows the ring gear to be locked to the housing 60, thus holding the same against rotation. When the brake 59 is disengaged the ring gear is free to move but since immediately upon such disengagement the planet spider 54 will also tend, through the overrunning clutch 56, to lock the power shaft 30 directly to the sun gear and consequently directly to the pump or impeller 5.

In the form of this invention shown in Figure 4 there is a ratio drive consisting of a first overdrive ahead of the torque converter A in the planetary gearing C. This overdrive is from the power shaft 30 through the planetary system C into the sun gear 50 and thence into the pump member 5 of the torque converter. Consequently, the torque converter is driven at a higher speed than the engine speed to produce the desired efficiency in the torque converter. This overdrive of the pump member is produced only when the brake 59 is engaged to lock the ring gear 53 against rotation. Within the torque converter, if the clutch 37 and brake 40 are disengaged and the brake 22 is engaged, the power flows from the pump member 5 into the rotor 6 and thence into the sun gear 36 of the planetary system B. As soon as the brake 22 is engaged the planet spider is held against rotation and, consequently, gear reduction is produced in the planetary system B, thereby driving the shaft 28 at a reduced speed through the ring gear 27. As the vehicle picks up speed and the desired reduction of drive is no longer required, the torque converter can be coupled into torque drive by engaging the clutch 37 which clutches the elements 5 and 6 together for conjoint drive so that the sun gear 50 directly drives the second sun gear 36.

A still further reduction of ratio can be produced by disengaging the brake 22 and engaging the clutch 23 which, in turn locks the planet system B using a ratio which will produce a one-to-one drive therethrough, whereby an overdrive in the transmission is produced since the planetary system C is still operated through the overdrive. However, prior to producing this overdrive it is normally desirable to provide additional torque which can be produced by releasing the brake 59, whereby the shaft 30 is directly coupled into the pump member 5 and thence through the converter to the sun gear. It will be seen that with such an arrangement a multiplicity of combinations is provided for the drive since any one of the assemblies A, B or C may be changed from a ratio drive to a direct drive, if desired.

In Figure 6 I have disclosed a transmission employing direct drive from the shaft 30 to the driven shaft 28. The flow of torque in this construction is indicated by the heavy black lines flowing through the overrunning clutch 56 and thence to the pump member 5 and the clutch 38 into the sleeve 35 to the sun gear 36. The planet spider 16 and the ring gear 27 being locked by engagement of the clutch 23, it will be apparent that direct drive is produced from the shaft 30 to the shaft 28. Control of clutches 37, 23, and brake 22 can change any one of the assemblies A, B or C into ratio drive, if desired.

In Figure 5 I have shown the transmission arranged for producing reverse drive. In this form the brake 59 is disengaged, whereby the shaft 30 tends to overrun the pump element 5 and is thereby locked through the clutch 56. The brake 40 being engaged locks the rotor 6 against rotation whereby the drive of the member 5 produces reverse rotation of the stator 7 and consequently produces through the clutch 9 the reverse rotation of the planet spider 16. With the brake and clutch 22 and 23 disengaged, the planet spider 16 will rotate the ring gear 27 in reverse direction thereby reversing rotation of the shaft 28. The flow of torque thus produced is indicated in heavy lines in Figure 5.

In the embodiment of the invention shown in Figures 4 to 6, inclusive, it will be apparent that no clutching operation will release torque from the power shaft 30 since if the brake 59 is released the member cannot run away since it will immediately lock up the overrunning clutch 56 with the driving element of the torque converter.

Similarly, the operation of the brake and clutch 22 and 23 will not at any time release the torque flow through the transmission since the power shaft 30 will always be driving through the impeller 6 under these conditions. In order to provide for no interruption of torque during shifting operations with the transmission shown in Figures 1, 2 and 3, I have modified this transmission as shown in Figure 7 in which corresponding reference numerals indicate corresponding parts. In this form of the construction I have interposed a fluid coupling between the shaft of sleeve 35 controlled from the impeller 6 and the braking surface 20' carrying the spider 16 and having both internal and external braking surfaces. The external braking surface is controlled by the brake 22' corresponding to the brake 22 and operated to lock the planet spider 19 against rotation relative to the housing. However, the internal braking surface is adapted to be engaged by a clutch 62 which is carried by the hub portion 63 of the driven member 64 of a fluid coupling indicated at D. The driving element 65 of the fluid coupling D is carried by and conjointly rotatable with the impeller 6.

Referring now to Figure 7 and assuming that the clutch 37 is actuated to clutch the shaft 32 to the impeller 5 and with the brake 40 released it will be seen that the torque conversion through the converter is eliminated and the sun gear 36 rotates at the same speed as the drive shaft 30. Assuming under these conditions that the brake 22' is engaged for holding the planet pinion carrier 19 against rotation, ratio drive is being imparted to the driven shaft 28. Under these conditions, when it is desired to shift from ratio drive to direct drive, the pump (not shown) for supplying fluid to the fluid coupling D is caused to be actuated to begin to fill the coupling so that the rotor 64 is picked up by the impeller 65, it being remembered that the impeller 65 is being rotated at the same speed as the drive shaft 30 since the clutch 37 is engaged, whereupon the clutch 62 is then actuated to couple the shaft 20' of the planet pinion carrier 19 to the rotor 64 without releasing the brake 22' until the clutch 62 is completely engaged. After the clutch 62 is fully engaged and the brake 22' released, then the clutch 23 may be engaged and the clutch 62 released, clutching the planet carrier to the ring gear for direct drive without interruption of the application of torque to the driven shaft 28. Thereafter, the coupling D may be emptied since it is not desired to transmit torque therethrough. Conversely, when it is desired to shift from direct drive to ratio drive through the planetary unit B, the clutch 62 is actuated and the coupling D filled with liquid so that the impeller 65 picks up the rotor 64 and when this operation is completed the clutch 23 is released, the torque being continuously applied to the drive shaft 28 through the fluid coupling D. Thereafter, the brake 22' is actuated and when it engages the braking portion 24 of the housing to hold the planet pinion carrier against rotation the clutch 62 is released and the coupling D is emptied. It will thus be seen that in either shifting from ratio to direct or direct to ratio in the planetary unit B, no interruption of torque to the shaft 28 occurs. Optionally, if desired, the clutch 62 may be actuated prior to the filling or emptying of the fluid coupling D to obtain the application of continuous torque to the driven shaft 28 in changing the gear ratio in the planetary unit B from direct drive to ratio drive, or from ratio drive to direct drive.

In this form of the invention, reverse drive is attained in the manner described in conjunction with Figures 1 through 3; namely, by releasing the clutch 37 and applying the brake 40 to hold the impeller 6 against rotation whereby it acts as a reactor member so that the member 7 is driven by the impeller 5 to provide reverse drive, as previously described, it being understood that for reverse the brake 22' and the clutches 23 and 62 being in their inoperative or released positions. While I have described the operation of the apparatus of Figure 7 inconjunction with the actuation of the clutch 37 to provide direct drive through the torque converter it is believed that it will be readily apparent that the continuous torque to the driven shaft 28 may be obtained in the same manner when the clutch 37 is in its inoperative position so that torque conversion through the torque converter A is being utilized.

In this form of the construction, when it is desired to shift from a position in which the clutch 23 is locked into a position in which the planet spider is locked in position relative to the housing, the coupling absorbs the shock of releasing the planet system B, when the clutch 23 is released, by coupling the impeller 6 to the planet spider so that the engine does not have a chance to run away. Similarly, when the brake 22' is released prior to engagement of the clutch 23, or if both the clutch and brake are released such as the condition when direct drive is effected by engagement of the clutch 37 the coupling D is provided to prevent the engine from running away. The coupling D is arranged between the impeller 6 of the torque converter and the planet spider so that the engine is held down by the torque converter while the clutches are being shifted. This arrangement provides, therefore, the same advantages produced in the forms shown in Figures 4 to 6 in that power shifting can be provided without at any time losing control of the torque through the transmission. Thus at no time is the engine capable of speeding up due to release of the planet system when a shift into direct or ratio drive is contemplated.

I am aware that various changes may be made in certain details of the construction which I have disclosed and the illustrated embodiments of my invention are to be taken as diagrammatic only as embodying only the underlying principles thereof. I therefore do not intend to be limited except in so far as defined by the scope and spirit of the appended claims.

I claim:

1. In a transmission, a torque converter having a driving element, a driven element and a reaction member, a driven shaft, a planetary gear system interposed between said converter and said shaft including a ring gear secured to said shaft, a planetary spider having a connection to said reaction member, and a sun gear having a connection to said driven element, and control means including brake and clutch means for locking said spider against rotation or for conjoint rotation with said ring gear, respectively, and secondary brake and clutch means for locking said driven element against rotation or for conjoint rotation with said driving element, respectively.

2. In a transmission, a torque converter having a pump, rotor and stator, a planetary gear system having a ring gear, sun gear and a planet spider therebetween, said sun gear being connected to said rotor, said ring gear being connected to a driven shaft, an overrunning clutch connection between said stator and spider, and externally accessible brake means for locking said sun gear against rotation whereby said stator drives said shaft through said spider and ring gear in a reverse direction.

3. The transmission of claim 2 further characterized in the provision of a clutch for locking said spider and ring gear for conjoint rotation.

4. A transmission comprising a torque converter including a stator, a shaft extending through said stator, an overrunning clutch mounting said stator on said shaft, a pinion carrying planet spider carried by said shaft, a sun gear driven by said converter for engaging the spider pinions, a ring gear driven by said pinions, overlapping portions on said spider and ring gear, clutch means operable to lock said portions together for conjoint rotation, and independent brake means for holding said spider against rotation.

5. The transmission of claim 4 further characterized in the provision of overlapping portions on the driving and driven elements of said converter, and clutch means operable to lock said portions together for direct drive therebetween.

6. The transmission of claim 4 further characterized in the provision of brake means for locking the sun gear against rotation whereby said converter drives said stator in reverse direction and thus reversely drives said spider.

7. A transmission including a driving shaft, a planetary gear system including a planet spider driven by said shaft, a sun gear driven from said spider, overrunning clutch means between said shaft and sun gear for coupling them together when said shaft tends to overrun said sun gear, a torque converter driven by said sun gear, a second planetary gear system including a sun gear driven by the driven element of said converter, said second system having a driven ring gear and an intermediate planet spider, and clutch means in said second system for clutching said ring gear and spider together and brake means for locking said spider against rotation.

8. The transmission of claim 7 including additional clutch means for coupling the driving and driven elements of said converter for conjoint rotation.

9. The transmission of claim 7 including brake means for locking said second sun gear against rotation, and clutch means connecting said second planet spider to the stator of said converter, whereby said converter is adapted to drive said second spider and ring gear in reverse direction.

10. A transmission including a pair of axially spaced planetary gear systems, a driving shaft arranged to produce overdrive of the sun gear of the first system, a torque converter intermediate said systems having its driving element driven from said sun gear and having its driven element driving the sun gear of said second system, clutch means for connecting the driving and driven elements of said torque converter for conjoint rotation, and a driven shaft connected to the ring gear of the second system.

11. The transmission of claim 10 further characterized in the provision of independently operable annular clutch means for locking the driving and driven elements of each of said systems together for direct drive.

12. The transmission of claim 10 wherein said converter has a stator connected through an overrunning clutch to the planet spider of said second system, and independent brake means operable to lock the driven element of said converter and the sun gear of said second system against rotation, whereby the stator of said converter drives said driven shaft and said spider and said second system in a reverse direction.

13. The transmission of claim 10 wherein each of said systems and said converter have independent clutch and brake means associated therewith for optionally locking one element thereof against rotation or locking the driving and driven elements for conjoint rotation to produce either ratio or direct drive selectively in each system and in said converter.

14. The transmission of claim 7 including additional independently operable clutch means for coupling the driving and driven elements of said converter for conjoint rotation, and additional independently operable brake means for locking said driven element of said converter against rotation.

15. In a transmission, the combination of a torque converter comprising driving and driven elements, a planetary gear system having a sun gear connected to said driven element, a first clutch for clutching said driving and driven elements together for conjoint rotation, a second clutch for clutching the planet spider and the ring gear of said planetary gear system for conjoint rotation, brake means for holding said planet spider against rotation, a fluid coupling intermediate said torque converter and said planetary gear system, said fluid coupling having an impeller connected to said driven element, and clutch means intermediate the rotor of said fluid coupling and said brake means.

16. The combination of claim 15 characterized by the provision of a second brake means for holding the driven element of the torque converter against rotation, and an overrunning clutch associated with the stator of the torque converter and the planet spider of the planetary gear system for driving the ring gear of the planetary gear system in a reverse direction upon actuation of said second brake means.

17. The combination of claim 1 characterized by the provision of means between said planetary spider and the reaction member of said converter providing for the continuous application of torque to the driven shaft upon actuation of the first brake and clutch means.

18. A transmission including a pair of axially spaced planetary gear systems, a torque converter intermediate said planetary gear systems having its driving element connected to the sun gear of first system and its driven element connected to the sun gear of the second system, a drive shaft for driving the planet spider of said first system, an overrunning clutch disposed between said drive shaft and the sun gear of said first system, brake means operable for holding the ring gear of said first system against rotation to impart driving force from said drive shaft to said driving element of said torque converter through said sun gear or for rendering said first planetary gear system inoperative and thereby transmit torque from said drive shaft to said driving element of said torque converter through said overrunning clutch.

19. In a transmission, a torque converter having a driving element, a driven element and a reaction member, a driven shaft, a planetary gear system comprising three elements, namely; a sun gear, a ring gear, and a spider having planet pinions, said planetary gear system being interposed between said converter and said driven shaft, one of the elements of said planetary gear system being secured to said driven shaft, a second element of said planetary gear system having a connection to said reaction member, and the third element of the planetary gear system having a connection to said driven element of said torque converter, and control means including brake and clutch means for locking said second element of said planetary gear system against rotation, or for conjoint rotation with said first element of said planetary gear system, respectively, and secondary brake and clutch means for locking said driven element of said torque converter, respectively, against rotation, or for conjoint rotation with said driving element of said torque converter.

20. The combination of claim 19 characterized by the provision of means associated with one of the elements of the planetary gear system and the reaction member of said torque converter providing for the continuous application of torque to the driven shaft upon actuation of the first brake and clutch means.

21. A transmission comprising a torque converter including a stator, a shaft extending through said stator, an overrunning clutch mounting said stator on said shaft, a planetary gear system comprising three elements namely; a sun gear, planet spider having planet pinions, and a ring gear, one of the elements of said planetary gear system being carried by said shaft, a second of said elements of said planetary gear system being driven by said converter and engaging the third element of the planetary gear system, the third element of said planetary gear system being driven by said planet pinions, and clutch means operable to lock said second and third elements of said planetary gear system together for conjoint rotation, an independent brake means for holding said second element of said planetary gear system against rotation.

22. A transmission including a pair of axially spaced planetary gear systems, each of said planetary gear systems comprising a sun gear, a ring gear, and a planet carrier having planet pinions, a driving shaft arranged to produce overdrive of one of the elements of the first planetary gear system, a torque converter intermediate said system having its driving element driven from said first element of said first planetary gear system and having its driven element driving an element of said second planetary gear system, clutch means for connecting the driving and driven elements of said torque converter together for conjoint rotation, and a driven shaft connected to a second element of the second planetary gear system.

23. In a transmission, the combination of a torque converter comprising driving and driven elements, a planetary gear system comprising three elements namely; a sun gear, a ring gear and a planet carrier having planet pinions, one of the elements of said planetary gear system being connected to said driven element of said torque converter, a first clutch for clutching said driving and driven elements of said torque converter together for conjoint rotation, a second clutch for clutching the second element and the third element of said planetary gear system together for conjoint rotation, brake means for holding said planetary gear system against rotation, a fluid coupling intermediate said torque converter and said planetary gear system, said fluid coupling having an impeller to said driven element of said torque converter, and clutch means intermediate the rotor of said fluid coupling and said brake means.

WILLIAM S. JAMES.

CERTIFICATE OF CORRECTION.

Patent No. 2,351,213. June 13, 1944.

WILLIAM S. JAMES.

It is hereby certified that error appears in the printed specification of the above numbered patent requiring correction as follows: Page 1, first column, line 9, before the word "drive" insert --ratio--; and that the said Letters Patent should be read with this correction therein that the same may conform to the record of the case in the Patent Office.

Signed and sealed this 26th day of September, A. D. 1944.

(Seal)

Leslie Frazer
Acting Commissioner of Patents.